US006482889B1

(12) United States Patent
Kurz

(10) Patent No.: US 6,482,889 B1
(45) Date of Patent: Nov. 19, 2002

(54) ADHESION PROMOTER FOR TEXTILE REINFORCING INSERTS, METHODS OF MANUFACTURE AND IT USE

(75) Inventor: Guenter Kurz, Tamins (CH)

(73) Assignee: EMS-Chemie AG, Domat (CH)

( * ) Notice: Subject to any disclaimer, the term of this patent is extended or adjusted under 35 U.S.C. 154(b) by 0 days.

(21) Appl. No.: 09/533,280

(22) Filed: Mar. 22, 2000

(30) Foreign Application Priority Data

Mar. 23, 1999 (DE) .......................................... 199 13 042

(51) Int. Cl.⁷ .............................. C08J 3/00; C08K 3/20; C08K 7/16; C08L 75/00
(52) U.S. Cl. ........................ 524/589; 523/223; 524/590; 524/591; 524/839; 524/840
(58) Field of Search ................................ 524/589, 590, 524/591, 839, 840; 523/223

(56) References Cited

U.S. PATENT DOCUMENTS

| 4,477,619 A | 10/1984 | Lattimer et al. |
| 4,569,963 A | 2/1986 | Hisaki et al. |
| 4,742,095 A | * 5/1988 | Markusch et al. .......... 523/322 |
| 5,959,027 A | * 9/1999 | Jakubowski ................ 524/839 |

FOREIGN PATENT DOCUMENTS

| EP | 0 137 427 | 4/1985 |
| EP | 0 739 961 | 10/1996 |
| EP | 0 835 891 | 4/1998 |
| WO | 94/22935 | 10/1994 |

* cited by examiner

Primary Examiner—Patrick D. Niland
(74) Attorney, Agent, or Firm—Leydig Voit & Mayer, Ltd.

(57) ABSTRACT

The invention concerns an adhesive for the treatment of reinforcement inserts for the production of reinforced polymer products in the form of an aqueous dispersion, containing an adhesive as a solid and additives. The aqueous dispersion has a solids fraction of 55–85 wt % provided that the average particle diameter of the solids is <2.0 μm.

10 Claims, 2 Drawing Sheets

_US 6,482,889 B1_

Figure 1:
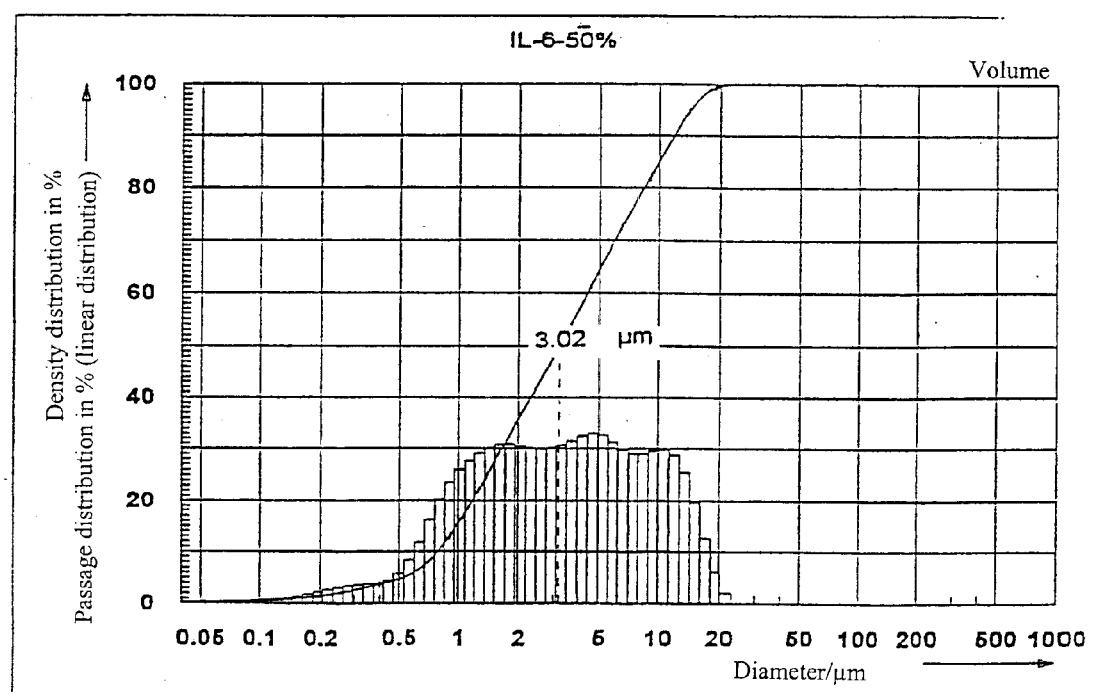

ADHESION PROMOTER FOR TEXTILE REINFORCING INSERTS, METHODS OF MANUFACTURE AND IT USE

RELATED APPLICATIONS

This application claims the benefit of German Application Serial No. 199 13 042.6, filed Mar. 23, 1999.

BACKGROUND OF THE INVENTION

The invention concerns an adhesive for the treatment of textile reinforcement inlays for the production of textile-reinforced rubber products, in particular for a tire cord that is present in the form of an aqueous dispersion with a solids fraction of blocked isocyanate of 55–85 wt %.

In the production of fiber-reinforced rubber products, it has proved advantageous if an adhesive is used for the improvement of the adhesive strength between textile reinforcement inlays and the rubber. The use of such an adhesive, in particular in the area of tire cords and other high-stress composite materials with reinforcement fibers, is important. Especially for these fields of application, the use of resorcinol-formaldehyde-latex systems (RFL) for the bonding of synthetic fibers to rubber products is known from the state of the art. In accordance with the method, the procedure can be carried out in a one-step or in a two-step method. In the one-step method, an impregnation of the reinforcement element with a mixture of RFL and an adhesive is carried out.

In the two-step method, an impregnation of the reinforcement element is undertaken first with the adhesive and then the application of RFL is carried out in a second step.

From the state of the art, specially coordinated adhesives are also already known for such methods. These systems are based on a special formulation of an aqueous dispersion of blocked isocyanates in combination with RFL. In an overview article from "Rubber Chemistry and Technology," Vol. 58, p. 383–391, the corresponding adhesive systems and the methods for the production of fiber-reinforced rubber products are described. A special adhesive system is disclosed in U.S. Pat. No. 4,477,619.

From "Tire Technology International," 1994, page . . . to . . . , an adhesive system is known, which is sold under the name Grillbond IL-6® by the EMS Chemie AG in Switzerland. This system consists of an aqueous dispersion, which contains a 50% solids fraction of a blocked isocyanate. In comparison with the powders which are also known from the state of the art, this system has, in particular, the advantage that the aqueous dispersion is stable in storage and can be used immediately. This makes possible a simple handling and an economical execution of the method. At the same time, it has been shown that, in this way, neither an agglomeration nor a sedimentation of solids occurs, as is obviously the case in the preparation of powders with water.

The disadvantage with the previously described aqueous dispersion Grillbond®, however, is that the solids fraction is relatively low and that for this reason, large quantities must be used, so as to guarantee a complete impregnation of the fibers.

Therefore, on the basis of this, the goal of the invention under consideration is to propose an adhesive system which has an increased solids fraction, in comparison to the state of the art, and with which a complete impregnation of the fibers is possible.

The goal is preferably achieved by the characterizing features of the invention. Advantageous embodiments and further developments of the invention will be apparent from the description provided herein.

Surprisingly, the applicant was able to show that it is possible to obtain an aqueous dispersion with a solids fraction of 55–85%, if the average particle size of the solids is <2.0 $\mu$m. Experiments carried out by the applicant have shown that in the aqueous dispersions of the state of the art, average particle diameters of over 3 $\mu$m are present. By means of the dispersion proposed in accordance with the invention, wherein the average diameter of the solids particle is clearly below that of the prior state of the art, it is thus possible to increase the solids fraction to up to 85% without agglomerations or other disturbances occurring. The essential advantage of the aqueous dispersion according to the invention under consideration is that the work can now be carried out with lower quantities and thus with a more economical method. It has also been shown that the aqueous dispersion makes possible a complete impregnation of the reinforcement elements because of its uniform particle diameter. In this way, textile fiber-reinforced rubber products can be produced, which are clearly improved in their technical data—that is, in particular, in adhesive strength, in comparison to the state of the art.

It is particularly preferred in the aqueous dispersion in accordance with the invention, if the average particle diameter is <1.50 $\mu$m, with particular preference, <1.35 $\mu$m.

By experiments which were carried out by the applicant, it was possible to determine that 80% of the solids particles have a diameter of 0.01–5 $\mu$m. It is preferable, however, if the diameter is between 0.5 and 5 $\mu$m. This shows that a more uniform particle size distribution and smaller particle sizes are present in the aqueous dispersion in accordance with the invention than was the case with the state of the art. The particle size distribution varies only within very narrow limits. The dispersion in accordance with the invention accordingly contains the solids in the form of a fine or very fine comminution.

From a material point of view, the invention comprises, with regard to the adhesives, all isocyanates which, in fact, have been used up to now in the state of the art for these application cases. The invention thereby includes isocyanates and the corresponding reaction products from the isocyanates with themselves to form dimeric or oligomeric products and those with blocking agents, to form partially or completely blocked isocyanates. In general, all commercially obtained aromatic isocyanates and aliphatic and cycloaliphatic isocyanates can be used. Special examples include the following:

Diphenylmethane-4,4- and/or -2,4-diisocyanate (MDI), raw and purified polymer MDI (PMDI), and all other MDI isomers, such as: 3,4-MDI, 2,2-MDI, and/or 2,3-MDI. 2,4- and/or 2,6-toluene diisocyanate and their oligomers, in particular, dimerized 2,4-toluene diisocyanate. 1-Isocyanato-3-isocyanatomethyl-3,5,5,-trimethylcyclohexane (isophorone-diisocyanate or IPDI), hexamethylene diisocyanate (HDI). Polyisocyanates in the form of polyisocyanate adducts, for example, polyisocyanate-containing groups from isocyanurates, uretdiones, biuret, urethanes, allophanates, carbodiimides, and/or oxadiazines.

Examples of blocking agents include the following:

Monophenols, for example, phenol, resorcinol, cresol, trimethyl phenols, tert-butylphenols, lactams, for example, Hcaprolactam, Γ-valerolactam. Oximes, for example, methyl ethyl ketoxime (butanone oxime), methyl amyl ketoxime, and cyclohexanone oxime. Primary, secondary, and tertiary alcohols, glycol ethers, readily enol-forming compounds, such as acetoacetic ester, acetyl acetone, malonic acid derivatives. Secondary aromatic amines. Imides, mercaptans, and triazoles.

Wetting agents and/or dispersants are used as additives.

The adhesive in accordance with the invention is particularly suitable for textile reinforcement inlays, for example, made of polyester, polyethylene, polyamide, or rayon. The reinforcement inlays treated in this matter are used, in particular, for the production of tire cord, conveyor belts, V-belts, mechanical rubber parts, as well as composites.

The invention also concerns a method for the production of the previously described adhesive. The production of the adhesive in accordance with the invention is carried out thereby in a two-stage process. The procedure is such that in a first step, a preliminary dispersion of the adhesive is produced with water in the form of an aqueous dispersion with, for example, 50% solids content. In the further course, this preliminary dispersion is then subjected to a wet comminution, until the total material to be comminuted is water-thin and a viscosity of 5–150 mp, preferably 5–90 mp. The water-thin, comminuted material thus produced then permits the required further addition of solids, until the desired solids content of 55–85 wt % is attained. The wet comminution is thereby preferably carried out with a stirrer-ball mill.

If necessary, a dilution, for example, to 60% can again be produced by the further addition of water once a certain solids content, for example, of 70%, has established, if this should be necessary because of certain reasons for the production of very specific, selected rubber products.

Surprisingly, it has become evident that the adhesive system, produced as described in the preceding, has an excellent storage stability of at least one year. It was particularly surprising that with the adhesive composition in accordance with the invention, an addition of a thickener, as is required with compositions known from the state of the art, was not necessary. The settling behavior was thereby better without an additional thickener than with the formulations known from the state of the art.

Below, the invention is explained in more detail with the aid of FIGS. 1 and 2.

Figure 2:
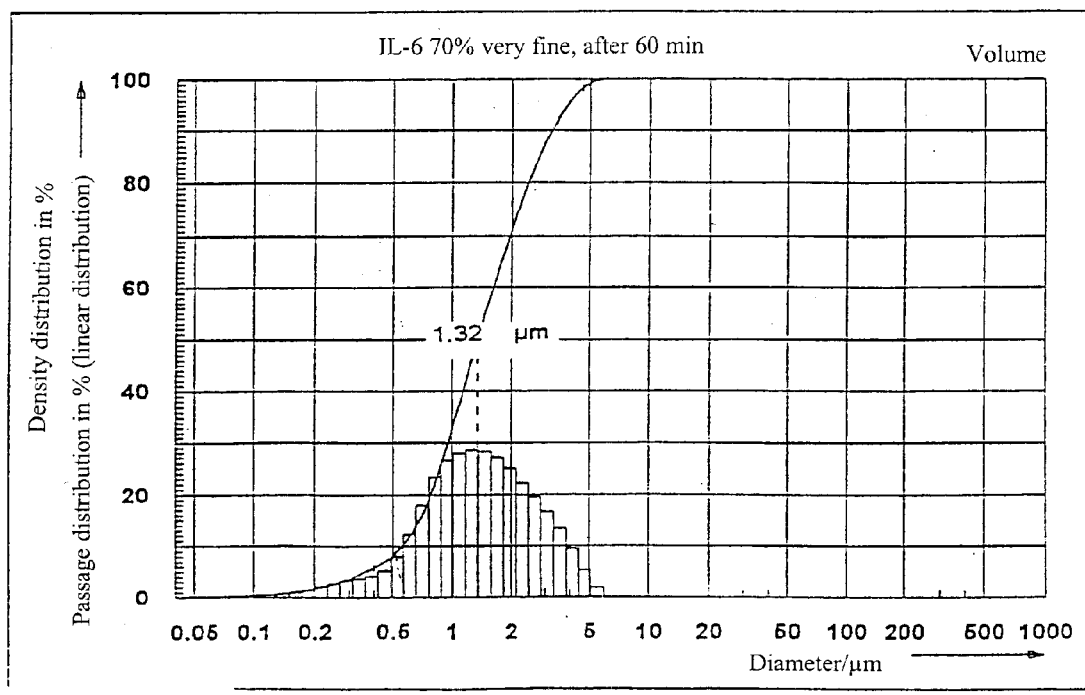

FIG. 1 hereby shows the particle size distribution of an aqueous dispersion IL-6 with a 50% solids fraction FIG. 2 shows the particle size distribution of a 70% solution with a very fine comminution.

FIG. 1 shows the particle size distribution of an adhesive dispersion as it has been known up to now in the state of the art. As can be seen from the particle size distribution, this adhesive dispersion has a very broad size distribution. The individual particle sizes of the adhesives vary in the range of 0.1–20 $\mu$m. The average particle diameter of the solids thereby lies at 3.02 $\mu$m.

FIG. 2 shows the same measurement results with an adhesive in accordance with the invention. The particle size distribution essentially varies between 0.1 and 5 $\mu$m. 80% of the solids thereby have a diameter of 0.5–5 $\mu$m. The average particle diameter of the solids is, accordingly, 1.32 $\mu$m. In particular, these selected particle diameters permit the realization of an adhesive, which is as highly concentrated as described in accordance with the invention. For a specialist, it was thereby completely surprising and not expected that this adhesive exhibits an excellent storage stability and thereby also has an adhesive strength which is clearly improved in comparison to the state of the art.

I claim:

1. An adhesive for the treatment of reinforcement inlays for the production of reinforced polymer products in the form of an aqueous dispersion, comprising a solid adhesive and at least one additive, wherein the aqueous dispersion has a solids fraction of 65–75 wt %, provided that the average particle diameter of the solids is <2.0 $\mu$m, wherein 80% of the solid particles have a particle diameter of 0.5–5 $\mu$m.

2. The adhesive according to claim 1, wherein the average particle diameter is <1.50 $\mu$m.

3. The adhesive according to claim 1, wherein the adhesive comprises isocyanates, or partly or completely blocked isocyanates.

4. Reinforced rubber products produced using the adhesive of claim 1.

5. Textile reinforcement inlays treated with the adhesive of claim 1.

6. The textile reinforcement inlays according to claim 5, wherein the reinforcement inlays are made of polyester, polyethylene, polyamide or rayon.

7. The adhesive according to claim 1, wherein it contains wetting agents and/or dispersing agents as additives.

8. The adhesive of claim 1, wherein the average particle diameter of the solids is <1.35 $\mu$m.

9. The adhesive of claim 3, wherein the isocyanates are selected from the group consisting of aromatic isocyanates, aliphatic isocyanates, and cycloaliphatic isocyanates, dimers thereof, and oligomers thereof.

10. The adhesive of claim 3, wherein the partially or completely blocked isocyanates are reaction products of isocyanates with blocking agents, wherein the blocking agent is selected from the group consisting of monophenols, lactams, oximes, primary alcohols, secondary alcohols, tertiary alcohols, glycol ethers, enol-forming compounds, secondary aromatic amines, imides, mercaptans, and triazoles.

* * * * *